April 14, 1925. 1,533,945

C. R. RECKART

BRAKE BAND CONTROL

Filed Feb. 23, 1924

INVENTOR.
C. R. Reckart,
BY
Geo. P. Kimmel
ATTORNEY.

Patented Apr. 14, 1925.

1,533,945

UNITED STATES PATENT OFFICE.

CHARLES R. RECKART, OF BRADY, WEST VIRGINIA.

BRAKE-BAND CONTROL.

Application filed February 23, 1924. Serial No. 694,658.

*To all whom it may concern:*

Be it known that I, CHARLES R. RECKART, a citizen of the United States, residing at Brady, in the county of Monongalia and State of West Virginia, have invented certain new and useful Improvements in Brake-Band Controls, of which the following is a specification.

This invention relates to brake band operating devices, and has for one of its objects to provide a simply constructed device whereby the brake band is held firmly in position, and prevented from displacement by severe strains or concussions to which the supports and drums to which it is associated may be subjected.

The improved device is designed more particularly for use upon mining machinery, but may be applied to other forms of machinery or apparatus.

With this and other objects in view the invention consists in certain novel features of construction as hereinafter shown and described and then specifically pointed out in the claims, and in the drawings illustrative of the preferred embodiment of the invention.

Figure 1:
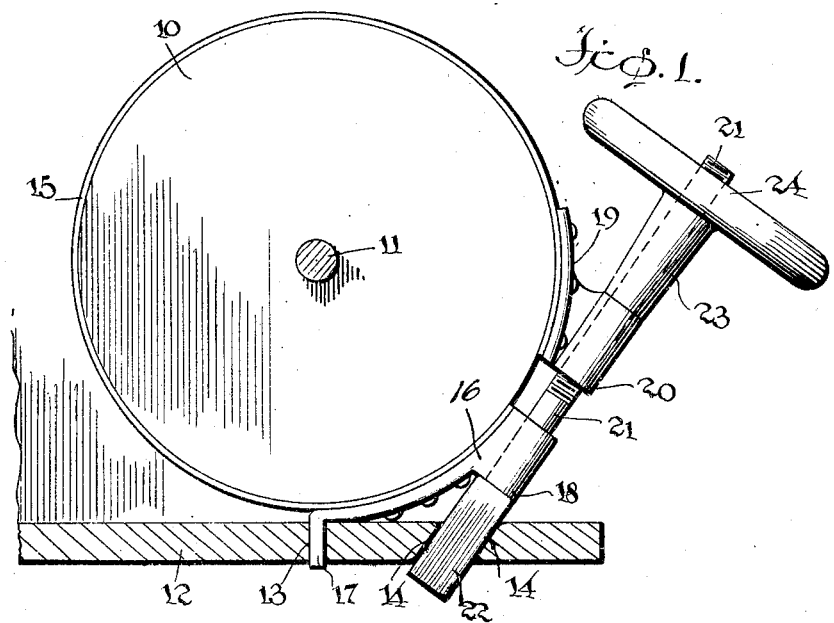
Figure 1 is a side elevation of a conventional brake drum and its band and a portion of the drum support with the improvement attached.
Figure 2:
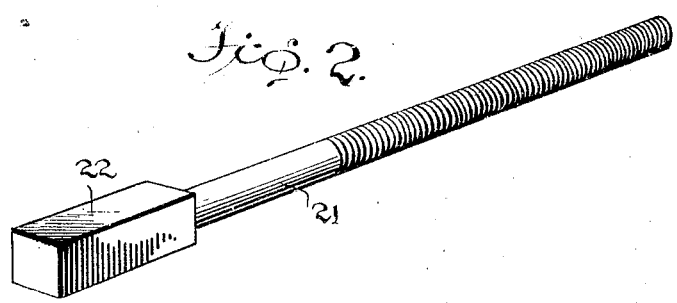
Figure 2 is a perspective view of the strain applying bolt detached.

A brake drum is represented conventionally at 10 mounted on a shaft 11, and a portion of the drum support at 12.

Formed in the support 12 is a socket or seat 13, and likewise formed through the support is a guide opening 14, the latter of other form than round, for instance square.

The flexible and resilient brake band is represented at 15 and encompassing the drum 10 in the usual manner with the terminals in spaced relation, as shown.

Attached to the band at one end is a member 16 with the ends outturned as at 17 and 18, to form lug like projections. The portion 17 of the member 16 is received in the socket 13, while the portion 18 is transversely apertured.

Attached to the band 15 at the other end is a member 19 with one end 20 outturned and apertured like the portion 18 of the member 16.

A bolt 21 extends loosely through the apertures in the lugs 18 and 20 with a portion threaded and a portion 22 enlarged and of other form than round, for instance square, to correspond to the guide opening and slidably engage therethrough and thus held from rotation, while at the same time longitudinally movable, as will be obvious.

A nut device or threaded sleeve 23 engages the threaded portion of the bolt 21, and is provided means for rotating it, for illustration a hand wheel 24.

The inner end of the portion 22 of the bolt 21 constitutes a stop shoulder to bear against the adjacent face of the lug 18, while the inner end of the sleeve nut 23 bears against the outer face of the lug 20. By this simple arrangement when the sleeve nut is rotated in one direction by power applied to the hand wheel 24, strain will be applied to the brake band 15, and the latter will be rigidly held from slipping upon the band by the resistance offered by the lug 17, while at the same time the bolt will be held from displacement by the coaction of the square portion 22 of the bolt and the guide opening 14 of the support.

In operating brakes on machinery where severe strains and jolts or concussions are experienced, for instance in certain kinds of mining machines, the brake bands as ordinarily arranged and constructed are liable to slip, and the simple device herein shown and described effectually holds the band from slipping or from being otherwise displaced.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In a device of the class described, a support having a guide opening of other form than round and a socket, a flexible brake band adapted to encompass a brake drum, a stop lug extending from said band for engaging in said socket, apertured lugs extending respectively from said band at the ends thereof, a bolt engaging through said apertured lugs with a portion threaded and a portion of other form than round to engage the guide opening of the support and held from rotation thereby, and a nut element engaging the threaded portion of the bolt.

2. In a device of the class described a support having a guide opening of other form than round and a socket spaced from the guide opening, a flexible brake band adapted to encompass a brake drum, a member attached to said band at one end and with outturned portions at the ends thereof, one of said outturned portions being apertured and the other outturned portion engaging in the socket of the support, a member attached to the other end of the band and with an apertured outturned portion, a bolt engaging through the apertures of the outturned portions of said members and with one part threaded and another part of other form than round and slidably engaging the guide opening in the support and held from rotation thereby, and a threaded nut device engaging the threads of the bolt and bearing against the adjacent outturned portion.

In testimony whereof, I affix my signature hereto.

CHARLES R. RECKART.